United States Patent [19]

Hsiung

[11] Patent Number: 5,155,791
[45] Date of Patent: Oct. 13, 1992

[54] HYBRID OPTICAL WAVEGUIDES FOR PHASE-MATCHED NONLINEAR WAVELENGTH CONVERSION

[75] Inventor: Hui Hsiung, Wilmington, Del.

[73] Assignee: E. I. Du Pont de Nemours and Company, Wilmington, Del.

[21] Appl. No.: 761,598

[22] Filed: Sep. 18, 1991

Related U.S. Application Data

[63] Continuation-in-part of Ser. No. 623,587, Dec. 7, 1990, abandoned.

[51] Int. Cl.⁵ .................................................. G02F 1/35
[52] U.S. Cl. ..................................... 385/122; 359/332; 385/130
[58] Field of Search .......................... 359/326–332; 385/5, 11, 122, 129–132

[56] References Cited

U.S. PATENT DOCUMENTS

| | | | |
|---|---|---|---|
| 4,536,450 | 8/1985 | Garito | 428/411.1 |
| 4,792,208 | 12/1988 | Ulman et al. | 350/96.34 |
| 4,865,406 | 9/1989 | Khanarian et al. | 385/122 |
| 4,971,416 | 11/1990 | Khanarian et al. | 359/328 |
| 5,002,361 | 3/1991 | DeMartino et al. | 385/122 |
| 5,061,028 | 10/1991 | Khanarian et al. | 385/132 |

OTHER PUBLICATIONS

A. Yariv, et al., IEEE J. Quantum Electron., QE-13:233 (Apr. 1977).
S. Allen, Inst. Phys. Conf. Ser. No. 103, 2.3:163-174 (1989).
H. A. Haus, et al., Appl. Optics, 26(21):4576-4580 (Nov. 1987).
P. Stoeve, et al., Thin Solid Films, 146:209-220 (1987).
B. L. Anderson, et al., Thin Solid Films, 179:413-421 (1989).
J. R. Hill, et al., Inst. Phys. Conf-Ser. No. 103, 2.5:215-226 (1989).
G. G. Roberts, et al., Thin Solid Films, 132:113-123 (1985).
I. R. Girling, et al., Thin Solid Films, 132:101-112 (1985).
R. H. Tredgold, et al., Thin Solid Films 151:441-449 (1987).
S. Allen, et al., SPIE 682:97-102 (1986).
I. Ledaux, et al., Europhysics Lett. 3(7):803-809 (Apr. 1987).
I. Ledoux, et al., J. Chem. Phys. 85(11/12):1085-1090 (1988).
G. Decher, et al., Thin Solid Films, 178:445-451 (1989).
H. Sakaguchi, et al., Chem. Lett. 10:1715-1718 (1989).
M. M. Ahmad, et al., J. Molec. Elect. 2:129-133 (1986).
H. P. Nolting, et al., Proceedings of the Third European Conference, pp. 2-4 (May 1985). [ECIO'85].
R. V. Ramasniamy, et al., Journal of Nighwave Technology 6(6):984 $\propto$ 1002 (Jun. 1988).
J. C. Loulergue, et al., Thin Solid Films 160:399-405 (1988).
M. Sugi, J. Molec. Elect. 1:3-17 (1985).
B. Tieke, Adv. Mat's 2(5):222-231 (1990).
R. G. Hunsperger, Integrated Optics: Theory and Technology, Springer-Verlag, pp. 47-51 (1982).
G. A. Reider, et al., Optics Commun. 68(2):149-152 (Sep. 1988).
A. Bratz, et al., Appl. Phys. B. 50:393-404 (1990).
G. Marowsky, et al., Chem. Phys. Lett., 147(5):420-424 (Jun. 1988).

*Primary Examiner*—John D. Lee

[57] ABSTRACT

A waveguide for second order nonlinear wavelength conversion comprising a thin film embedded in an optically passive waveguiding medium wherein the film is nonlinear optically active and has periodic modifications of the nonlinear optical properties in the propagation direction, and said film thickness is less than 50% of the smallest effective transverse dimension of the waveguide, and said film width is greater than or equal to the largest transverse dimension of the waveguide, said waveguide is preferably surrounded by cladding media having lower refractice indices than the waveguide.

30 Claims, 3 Drawing Sheets

STEP 1

STEP 2

STEP 3

STEP 4

HYBRID OPTICAL WAVEGUIDES FOR PHASE-MATCHED NONLINEAR WAVELENGTH CONVERSION

CROSS-REFERENCE TO RELATED APPLICATION

This application is a continuation-in-part application of U.S. Pat. Ser. No. 07/623,587, filed Dec. 7, 1990 (abandoned).

FIELD OF THE INVENTION

The present invention relates to hybrid optical waveguides for efficient second-order nonlinear wavelength conversion that includes second-harmonic generation and sum-frequency and difference-frequency generation.

BACKGROUND OF THE INVENTION

For practical reasons it is often desirable to convert a laser light into a different wavelength. For example, in optical recording technology where semiconductor diode lasers are used as light sources, converting the near-infrared laser light into a blue light can significantly increase optical recording density. Optical wavelength conversion is usually accomplished by second-order nonlinear optical processes such as second-harmonic generation, sum- or difference-frequency generation, or other parametric processes.

Through these processes, one or two laser beams interact with a nonlinear optical medium to generate a coherent light beam at a different wavelength. The efficiency of the nonlinear wavelength conversion depends on the intensity of the excitation laser beam(s). If relatively low-power lasers (such as the diode lasers) are used, instead of performing the wavelength conversion in a bulk nonlinear optical medium, it is more advantageous to achieve it in a waveguide made of the nonlinear optical medium, the latter confining the laser beam(s) in a small area over the entire length of the guide and thereby yielding a much higher wavelength conversion efficiency.

In waveguides as well as in bulk media, normally two conditions must be met to achieve efficient wavelength conversion. First, the phase velocities of the interacting light waves must be matched—so called "phase-matching" condition. Second, the transverse field profiles of the light waves involved must overlap well with one another. To date, various schemes for phase-matched wavelength conversion in nonlinear optical waveguides have been proposed or experimentally demonstrated, either utilizing waveguide modal dispersion or periodic structures that modulate linear or nonlinear optical properties. Achieving phase matching using periodic structures has the advantage that, unlike matching waveguide modal dispersion, it does not impose restrictions on the dimensions of the waveguides, nor on any particular waveguide-mode combinations involved in the nonlinear processes.

The structure of a periodic waveguide for phase-matched nonlinear wavelength conversion is schematically shown in FIG. 1, where the wave-guiding region is made of a nonlinear optical medium, while the cover and the substrate regions may be either nonlinear optically active or passive. The cover and the substrate regions may generically be called cladding regions, i.e., regions which surround the waveguide, but which do not act as waveguides per se. Within the waveguide, the linear or nonlinear (or both) optical properties are spatially modulated along the wave propagating direction. The phase matching is achieved by making the modulation period exactly compensate for the mismatch among the phase velocities of the interacting light waves. [See, for example, A. Yariv and M. Nakamura, "Periodic structures for integrated optics", IEEE J. Quantum Electron. QE-13, 233 (1977).] Usually, under the phase-matching condition, higher efficiency for nonlinear wavelength conversion is obtained in periodic waveguides with the nonlinear (rather than linear) optical properties modulated. For example, Khanarian et al. U.S. Pat. Nos. 4,971,416 and 4,865,406 disclose a waveguide construction that consists essentially of a wave-guiding region made of a periodically poled nonlinear optical polymer film and two cladding, i.e., non-guiding, regions made of optically passive polymer films.

However, there are practical difficulties in fabricating many nonlinear optical materials into such a periodic waveguide. For example, with the Langmuir-Blodgett technique, thin films of certain organic nonlinear optical materials can be prepared, but their (linear or nonlinear) optical quality tends to degrade with increasing film thickness. [See, for example, the review article by S. Allen, "Langmuir-Blodgett films for nonlinear optical applications", in *Materials for Nonlinear and Electro-optics* 1989, Inst. Phys. Conf. Ser. No. 103 (Institute of Physics, Bristol and New York, 1989), p. 163.]. Consequently, it is usually difficult to make the nonlinear optical Langmuir-Blodgett films into waveguides (typically a few $\mu$m's in the transverse dimensions) of desirable optical properties.

Second-harmonic generation from a nonlinear optically active monomolecular layer (monolayer) has been incorporated in an otherwise optically passive waveguide. H. A. Haus et al., Appl. Optics, 26, 4576 (1987), proposed a waveguide structure, shown in FIG. 2a that consists of a passive waveguide, having a refractive index periodically modified along the guide, and a nonlinear optically active monolayer located at the boundary between the guide and the cover media. The monolayer can be viewed as a nonlinear optical source where the second-harmonic generation process actually occurs, and the passive waveguide allows confined propagation of both the input fundamental wave and the generated second-harmonic wave. Here, phase matching is achieved by adjusting the period of the refractive-index modulation.

G. A. Reider et al., Optics Commu., 68, 149 (1988), proposed a waveguide structure, depicted in FIG. 2b, that consists of essentially the same components as in FIG. 2a—but instead of a periodic guide region, the monolayer is spatially modified into a periodic grating-like structure for allowing phase-matched second-harmonic generation in the composite waveguide.

Recently, A. Bratz et al., Appl. Phys. B, 50, 393 (1990), have proposed a modified waveguide structure, shown in FIG. 2c, where the nonlinear optically active monomolecular layer is situated in the middle of the passive guide region. Compared to the waveguides in FIGS. 2a and 2b, this waveguide is predicted to yield a higher second-harmonic generation efficiency. Considering a model waveguide that contains a dye monolayer with a second-harmonic generation susceptibility of $10^{-13}$ esu (per monolayer), and ignoring optical absorption of the second-harmonic wave by the monolayer, Bratz et al. have predicted a second-harmonic generation conversion efficiency of 0.001% for a 1 cm-long waveguide and a 100 mW input power.

From a practical viewpoint, however, known compounds having a second-harmonic generation susceptibility of $10^{-13}$ esu (or larger) per monolayer often exhibit high optical absorptivity at the second-harmonic wavelength. For example, the value of the monolayer second-harmonic generation susceptibility used by Bratz et al. is based on that of a hemicyanine dye, but in that case the second-harmonic wavelength is at the peak of the dye's optical absorption band [G. Marowsky et al., Chem. Phys. Lett., 147, 420 (1988)]. The effect of the optical absorption by the monolayer is to reduce the second-harmonic generation conversion efficiency predicted by Bratz et al. by two or more orders of magnitude (i.e., an output less than $10^{-5}\%$ or 0.01 $\mu$W). This optical power level is to be compared, for example, with a power level of about 50 $\mu$W required for reading an optical disk.

Except for the proposal by Haus et al. (where a method for fabricating the periodic passive waveguide was suggested), the other two proposals dealt only with theoretical models without suggesting practical procedures for fabricating the composite waveguides.

It is therefore an object of the present invention to provide a waveguide for efficient second-order nonlinear wavelength conversion that includes both second-harmonic generation and sum-frequency and difference-frequency generation.

It is a further object of the present invention to provide a waveguide having improved conversion efficiency.

It is a further object of the present invention to provide a waveguide comprising a nonlinear optically active film, in which the net second order nonlinearity (i.e., the total nonlinearity of the film) increases with the film thickness, embedded in an otherwise optically passive waveguiding medium.

It is a further object of the present invention to provide a fabrication process for preparation of such a waveguide.

SUMMARY OF THE INVENTION

This invention provides a waveguide for second order nonlinear wavelength conversion comprising a thin film embedded in an otherwise optically passive waveguiding medium wherein said thin film comprises a nonlinear optically active medium having periodic modifications of the nonlinear optical properties along the propagation direction and wherein said film thickness is not greater than 50% of the smallest transverse dimension of the waveguide.

It is preferred that said film width is greater than or equal to the largest transverse dimension of the waveguide. In use it is preferred that the lengthwise top and bottom surfaces of the waveguide in accordance with this invention be covered by cladding media, i.e. a cover and substrate. The cladding media must have a lower index of refraction than the index of refraction of the waveguiding medium which it covers to insure that the wave remains confined to the waveguide.

This invention further provides a process for preparation of the above described waveguide comprising (1) preparation of a first optically passive waveguiding medium from an optically passive medium in planar or channel form;

(2) deposition on the surface of the first optically passive waveguiding medium a thin film having a net second order optical nonlinearity which increases with the film thickness;

(3) periodical modification of said film in the wave guiding direction by local irradiation of light or particles to generate a periodic structure of alternating modified and unmodified regions; and (4) deposition of a second optically passive waveguiding medium onto the film to form a complete waveguide having the film embedded therein.

DETAILED DESCRIPTION OF THE INVENTION

This invention provides for a modified waveguide structure for efficient second-order nonlinear wavelength conversion that includes second-harmonic generation and sum- and difference-frequency generation. The optical article, schematically shown in FIGS. 3 and 4, comprises a thin film of a nonlinear optically active film embedded in an otherwise optically passive waveguiding medium, which, in turn, is preferably surrounded by a cover or a substrate, i.e., cladding, which must have lower refractive indices than the waveguide.

Figure 1:
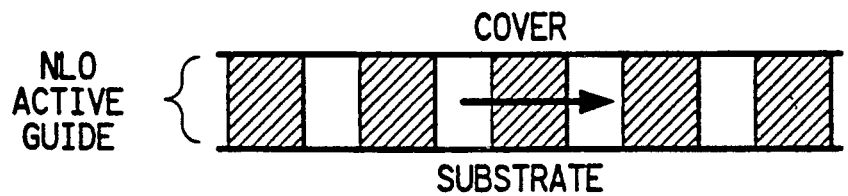
FIG. 1 is a schematic side view of the structure of a periodic waveguide for phase-matched nonlinear wavelength conversion wherein the waveguiding region comprises a nonlinear optical medium and the cover and substrate regions, or cladding regions, are nonlinear optically active or passive.
Figure 2A:
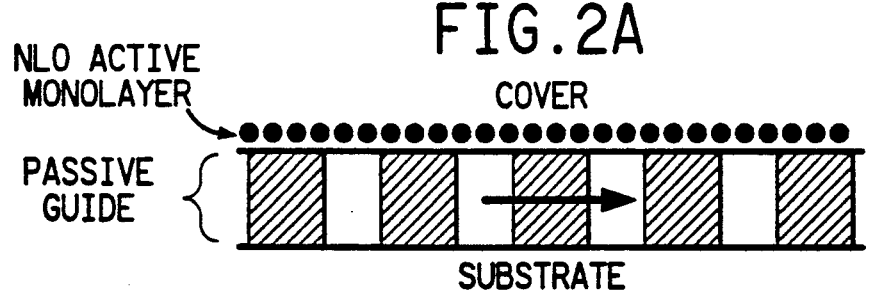
FIG. 2a is a schematic of a waveguide structure comprising a passive guide region having a refractive index periodically modified and a nonlinear optically active monolayer at the boundary between the guide and the cover media.
Figure 2B:
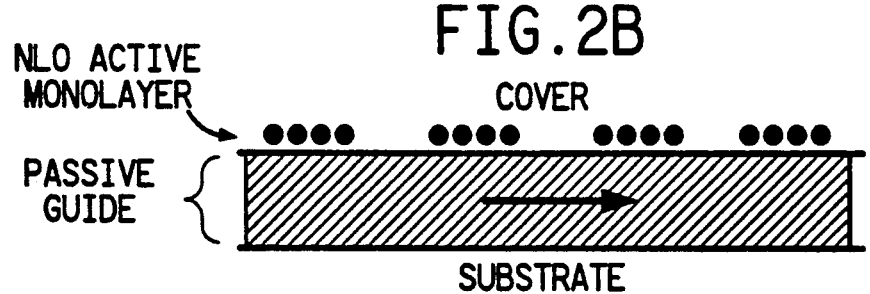
FIG. 2b is a schematic of a waveguide structure comprising a nonlinear optically passive guide region and a nonlinear optically active monolayer at the boundary between the guide and the cover media, said monolayer being spatially modified into a periodic structure.
Figure 2C:
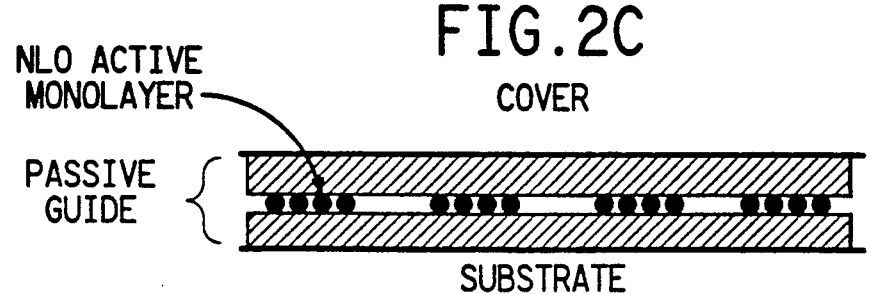
FIG. 2c is a schematic of a waveguide structure comprising a nonlinear optically passive guide region having embedded therein a nonlinear optically active monolayer which has been spatially modified into a periodic structure.

The thickness of the nonlinear optical film is no more than 50% of the smallest transverse dimension of the waveguide (e.g., no more than 2.5 μm for waveguides having transverse dimensions of 5 μm, which are compatible with single-mode optical fibers), commonly less than 5 μm. Preferably the minimum film thickness is equal to, or larger than, the equivalent of ten (10) nonlinear optically active monomolecular layers. The width of the nonlinear optically active film may be larger than, the waveguide's largest transverse dimension, though only the portion of the film within the guide contributes to the wavelength conversion. The preferred form of the waveguide of the present invention, depicted in FIG. 3, can be viewed as comprising five regions: a cover (or upper cladding), a first optically passive waveguiding medium, a periodically modified nonlinear optically active film, a second optically passive waveguiding medium and a substrate (or lower cladding). The waveguiding region of this depiction excludes the cover and substrate (or cladding). In contrast FIG. 1 depicts the conventional waveguide structure known in the art, wherein a periodically modulated nonlinear optically active film is directly associated with a cover and substrate without intervening layers of optically passive waveguiding medium.

For the preferred waveguide in accordance with the present invention, while the index of refraction ($n_g$) of the optically passive waveguiding medium must be higher than that of the surrounding cover (or upper cladding) and higher than that of the substrate (or lower cladding), the refractive index ($n_f$) of the nonlinear optically active film can be higher or lower than that of the surrounding optically passive waveguiding medium. However, if $n_f < n_g$, it is preferred that the thickness of the nonlinear optically active film be less than the quantity $(\lambda/2\pi)[(n_g)^2 - (n_f)^2]^{\frac{1}{2}}$, where $\lambda$ is the shortest wavelength involved in the nonlinear optical process.

Figure 4A:
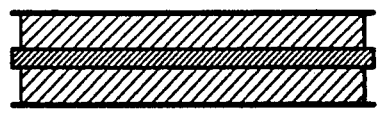
FIG. 4a depicts a refractive index profile of waveguide structure having a planar cross section.

Depending on the fabrication method used, the refractive index profile of the present waveguide can have various cross-sectional shapes as exemplified in FIG. 4, where the channel and the mixed channel-planar shapes offer better confinement for the laser beam(s) and therefore are preferred over the planar ones. Phase matching in the hybrid waveguide is achieved by periodical modifications of the nonlinear optical properties of the embedded thin film along the guiding direction. For the nonlinear optically active medium, an organic thin film prepared by the Langmuir-Blodgett method, or by electric-field poling of a spin-casted polymeric film, are preferred. It has been estimated that under optimum but realistic conditions, and for a standard 1-cm long waveguide and a 100 mW input power, 1% or more nonlinear wavelength conversion efficiency is achievable.

Figure 3:
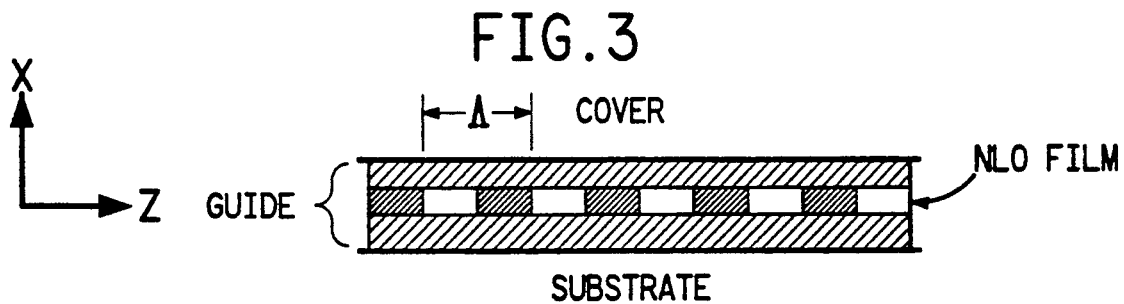
FIG. 3 is a schematic side view of the waveguide structure of the present invention comprising a nonlinear optically passive guide region having embedded therein a nonlinear optically active film which has periodic modifications along the propagation direction.

The waveguide of the present invention is schematically shown in FIGS. 3 and 4, where the interacting waves are assumed to propagate in the z-direction. Consider a nonlinear optical process in that two input waves at frequencies $\omega_1$ and $\omega_2$, respectively, are propagating in the waveguide and interacting with the nonlinear optically active film to generate a third propagating wave at frequency $\omega_3$. The conservation of photon energy requires that $\omega_3 = \omega_1 + \omega_2$ (sum-frequency generation), or $\omega_3 = \omega_1 - \omega_2$ for $\omega_1 > \omega_2$ (difference-frequency generation). Second-harmonic generation is a special case of sum-frequency generation where $\omega_1 = \omega_2$. The amplitude of each wave can be expressed as:

$$E^{(I)}(\omega_i) \propto F^{(I)}(x,y) \exp i[k^{(I)}(\omega_i)z - \omega_i t]. \tag{1}$$

where i = 1, 2 or 3; I denotes the particular waveguide mode under consideration, and $F^{(I)}(x,y)$ represents the transverse field distribution for that mode. The wave constant $k^{(I)}(\omega_i) = n^{(I)}(\omega_i)(\omega_i/c)$, where $n^{(I)}(\omega_i)$ is the refractive index of mode I, and c is the speed of light in vacuum.

The nonlinear susceptibility, $\chi^{(2)}(\omega_3 = \omega_1 \pm \omega_2)$, of the nonlinear optical film is spatially modified with a period $\Lambda$ along the z-direction. The periodic function can be expressed in terms of a Fourier series:

$$\chi^{(2)}(z) = \sum_{m=-\infty}^{+\infty} \chi_m^{(2)} \exp(i2m\pi z/\Lambda). \tag{2}$$

where m is an integer number. Phase matching occurs if $$\Lambda = 2\, m\pi\{k^{(K)}(\omega_3) - [k^{(I)}(\omega_1) \pm k^{(J)}(\omega_2)]\}^{-1}, \tag{3}$$

with (+) for sum-frequency generation, and (−) for difference-frequency generation. In a waveguide thus designed, $\Lambda$ is adjusted during the waveguide fabrication such that Equation (3) is satisfied.

In principle, phase matching for an arbitrary waveguide-mode combination can be achieved. Practically, however, the zeroth-order modes normally yield the highest wavelength conversion efficiency and also facilitate easier coupling with other optical components such as lasers or optical fibers. Therefore, zeroth-order modes are assumed in the following discussion.

The optimum transverse position of the nonlinear optical film is one that maximizes the overlap among the interacting optical fields, as characterized by the factor $$\kappa \propto \int dy\, [F^{(0)}(\omega_3) \cdot \chi_m^{(2)} \cdot F^{(0)}(\omega_1) F^{(0)}(\omega_2)]_{x=x_0}, \tag{4}$$

where the field strengths are evaluated at $x = x_0$, the (mean) position of the nonlinear optical film. For symmetric waveguides, $\kappa$ is maximum if the nonlinear optical film is located at the center of the guide.

If a Langmuir-Blodgett film consisting of stacking nonlinear optically active monolayers is used as the nonlinear optical film, and if its thickness is much smaller than the waveguide's dimension along the x-direction, the nonlinear wavelength conversion efficiency will roughly increase quadratically with the number of the nonlinear optical monolayers in the film.

Figure 5:
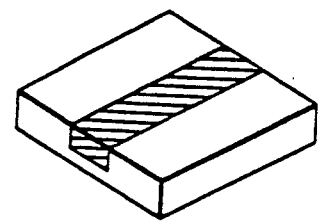
FIG. 5 is a schematic of the fabrication steps for formation of a waveguide. Step 1 depicts an optically passive waveguiding medium in channel form. Step 2 depicts deposition of a nonlinear optically active film on the optically passive waveguiding medium in channel form. Step 3 depicts formation of a periodic structure in the nonlinear optically active film. Step 4 depicts deposition of an optically passive waveguiding medium in planar form onto the nonlinear optically active film to form a waveguide in accordance with this invention.
Figure 5:
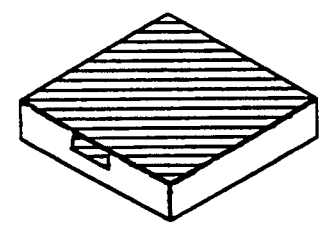
Figure 5:
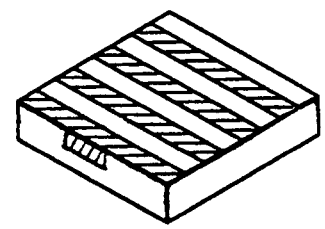
Figure 5:
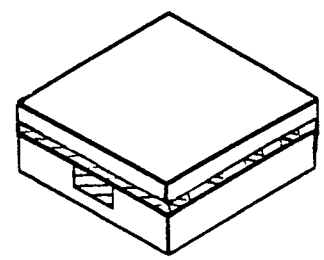

Generally speaking, the hybrid waveguide of the present invention can be fabricated by sandwiching a periodically modified nonlinear optical thin film between two halves of a passive optical waveguide, as illustrated in FIG. 5. The following are specific procedures that may be used.

In the first step, an optically passive waveguiding medium, either in a planar or a channel form (see FIG. 4), is made. This optically passive waveguiding medium can be a glass waveguide prepared by the ion-exchange technique [R. V. Ramaswamy and R. Srivastava, J. Lightwave Technology, 6, 984 (1988) herein incorporated by reference]. Normally, such a waveguide is prepared by dipping a flat glass slide into a molten nitrate salt of a monovalent cation such as $K^+$, $Rb^+$, $Cs^+$, $Ag^+$, or $Tl^+$, allowing time for the cations to diffuse into the glass substrate and exchange with the sodium ions in the glass. This process results in a waveguide near the surface of the glass substrate. Depending on the cation used, the refractive index in the waveguide is increased by about 0.01–0.1 above that of the substrate, and the waveguide's depth can be controlled by the temperature of the molten bath (typically in the range 250° C.–550° C.) and the duration of the ion-exchange process. If an optically passive waveguiding medium in channel form is desired, a lithography procedure is first employed to create a patterned mask on the glass surface such that the ensuing ion-exchange process only occurs in the exposed area.

Figure 4B:
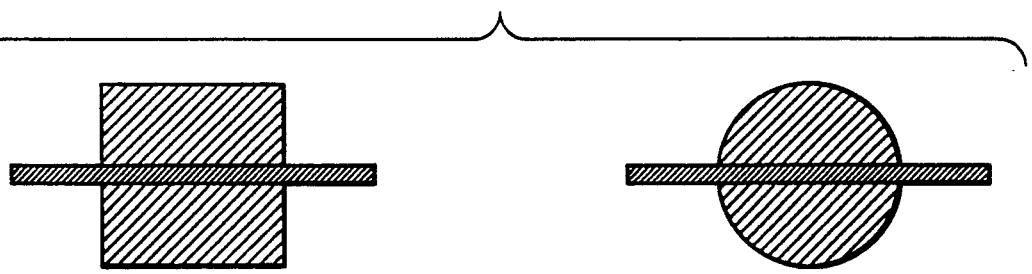
FIG. 4b depicts refractive index profiles of waveguide structures having a channel cross section.

Another method for making an optically passive waveguiding medium is by polishing off a portion of the cladding of an optical fiber until the fiber core is exposed, resulting in a hemicylinder-shaped guide [FIGS. 4(b) and (c)]. See, for example, B. K. Nayar, *Integrated Optics*, eds. H. P. Nolting and R. Ulrich (Springer-Verlag, Berlin, 1985), p. 2, herein incorporated by reference. Dielectric thin films (such as $SiO_2$) deposited by sputtering can also form waveguiding medium and be used herein. [See, for example, R. G. Hunsperger, *Integrated Optics: Theory and Technology* (Springer-Verlag, Berlin, 1982), pp. 47–51, herein incorporated by reference]. Polymeric thin films deposited from their solutions can be used as optically passive waveguiding medium as well. A recent example is a low-loss thin-film waveguiding medium formed from an aqueous solution of pure gelatin by spin-casting [R. T. Chen, W. Phillips, T. Jannson and D. Pelka, Optics Lett., 14, 892 (1989), herein incorporated by reference]. Certain Langmuir-Blodgett films made of optically passive materials may also form the desirable optically passive waveguiding medium.

In step 2, a thin film that exhibits second-order optical nonlinearities is deposited on the surface of a first optically passive waveguiding medium prepared as above. The Langmuir-Blodgett method, for example, can be used to fabricate thin films of certain organic nonlinear optical materials with the film thickness controlled to within a monomolecular layer [see, for example, M. Sugi, J. Mol. Electron., 1,3 (1985), herein incorporated by reference, and the article by S. Allen cited above]. First, a monolayer of an amphiphilic compound (or polymer) that possesses second-order nonlinear polarizability is spread on the water surface in a Langmuir trough. The monolayer is then compressed to a desirable surface density (or surface pressure). By repetitively dipping and withdrawing the half waveguide into and out of the monolayer-clad water while keeping the surface density (pressure) constant, the molecules are transferred, monolayer by monolayer, to the surface of the first optically passive waveguiding medium. The thickness of the Langmuir-Blodgett film is controlled by the number of dipping-withdrawing cycles. For second-order nonlinear optics, the multilayer structure must be noncentrosymmetric, and it is often necessary to prepare Langmuir-Blodgett films that consist of alternate monolayers of two compounds (or polymers). This can be achieved by using two Langmuir troughs—each covered with a monolayer of one compound (or polymer). Examples of suitable Langmuir-Blodgett materials are given herein and others are given by S. Allen's review article, and by B. Tieke, Adv. Mater., 2, 222 (1990), herein incorporated by reference.

Polymeric thin films poled by electric fields are also candidates for the nonlinear optical film in the device of the present invention. In this case, the polymeric films, prepared normally by spin-casting, must contain chromophores that possess large second-order nonlinear polarizabilities as well as permanent dipole moments. Under an electric field, the molecular dipoles are partially aligned to yield a macroscopic $\chi^{(2)}$. See, for example, J. R. Hill, P. Rantelis and G. J. Davies, *Materials for Nonlinear and Electro-optics* 1989, Inst. Phys. Conf. Ser. No. 103 (Institute of Physics, Bristol and New York, 1989), p. 215, herein incorporated by reference.

In the third step for fabrication the waveguide of the present invention, the $\chi^{(2)}$ of the nonlinear optic film is periodically modified along the z-direction. This is achieved through local irradiation of the nonlinear optical film by an intensive optical radiation (e.g., UV light, X-ray) in the absorptive region of the film, or by a particle beam [e.g., electrons or ions. The so-called "electron-beam lithography", for example, is extensively reviewed in IBM J. R. & D., 32, No. 4 (1988)]. Any of the above methods can generate in the nonlinear optical film a grating-like periodic structure consisting of alternately irradiated and non-irradiated striped (perpendicular to the z-direction) regions. It is preferred that all stripes, irradiated or non-irradiated, have an identical width$=\Lambda/2$, where $\Lambda$ is the spatial period that satisfies the phase-matching condition given by Equation (3). An irradiation process may either alter the chemical structure of the nonlinear optical material, which leads to changes in the film's nonlinear optical responses, or it may simply remove the irradiated portions of the film from the waveguide surface. As an example of this process, the local second-harmonic generation response of a Langmuir-Blodgett film made from polymers hereinafter described becomes very small in a film area irradiated by an $Ar^+$laser at 351–364 nm over a proper period of time.

In the fourth fabrication step a second optically passive waveguiding medium is formed by directly depositing a thin film by sputtering or spin-casting, or by the Langmuir-Blodgett method, onto the nonlinear optical film which has been deposited onto the first optically passive waveguiding medium. This results in the simultaneous formation of a waveguide of the present invention. However, care must be taken to ensure that the waveguide deposition processes do not damage the nonlinear optical film. For example, using water as the spin-casting solvent (as is the case for casting gelatin films mentioned in Step 1) does not cause any noticeable damage in polymeric Langmuir-Blodgett films.

Alternatively, the second optically passive waveguiding medium may be prepared separately on a substrate, then glued to the nonlinear optical film, which has been deposited onto the first optically passive waveguiding medium, with an optical epoxy or, even more simply, pressed onto the nonlinear optical film, which has been deposited onto the first optically passive waveguiding medium, using an oil filling having the same refractive index to fill any air gaps which might be present.

As a special case, a hybrid waveguide without the second passive waveguiding medium may also be used. However, the simplified fabrication procedure will be traded off by a smaller field overlap in such a waveguide, leading to a smaller wavelength conversion efficiency. (See Equation (4))

Langmuir-Blodgett films suitable for use in the present invention comprise films having second order optical nonlinearity made up of a multiplicity of adjacent polymeric amphiphilic monolayers. The monolayers are all polymers, some containing substituent groups having a second order nonlinearly polarizable chromophore, and others containing substituent groups with weak or no hyperpolarizability. The net second order optical nonlinearity of a Langmuir-Blodgett film increases with the number of nonlinear optically active monolayers.

The following definitions are used in describing the Langmuir-Blodgett films.

The term "polymer" is used herein to mean macromolecules containing three or more repeating units.

The term "chromophore" is used herein to mean a second order nonlinearly polarizable moiety within a polymer. The chromophore dipoles must be aligned in the same average direction to achieve an increase in second order nonlinear optical activity with an increasing number of monolayers in a film.

The term "polarizable" is used herein to mean the capacity of a material to acquire an induced oscillating dipole moment when an oscillating field such as light passes through the material.

The term "hyperpolarizability" is used herein to mean nonlinearly polarizable. The induced oscillating dipole moment is no longer linearly proportional to the applied oscillating field.

The term "polymer A" is used herein to denote a polymer containing a second order nonlinearly polarizable chromophore.

The term "polymer B" is used herein to denote a polymer having weak or no second order nonlinear optical polarizability compared to a polymer A, or a polymer having second order hyperpolarizability which is opposite in sign relative to a polymer A.

The term "monolayer A" is used herein to mean a monomolecular layer of a polymer containing a second order nonlinearly polarizable chromophore, an active monolayer.

The term "monolayer B" is used herein to mean a monomolecular layer of a polymer having weak or no second order nonlinear optical polarizability, i.e., a buffer monolayer, or of a polymer whose second order hyperpolarizability is opposite in sign relative to a polymer A.

The Langmuir-Blodgett films useful in the present invention comprise various structural types. These include, for example, the AB-type, the ABB-type, or $AB_1B_2$-type and others.

A film of the AB structure is made up of alternating distinct polymeric, amphiphilic monolayers A and B. A film of the new ABB type is made of repeating units of one polymeric, amphiphilic monolayer A and two monolayers B of a distinct amphiphilic polymer wherein the two B monolayers have opposite dipole orientation to each other. A film of the $AB_1B_2$ structure is made of repeating units of three distinct polymeric, amphiphilic monolayers A, $B_1$ and $B_2$. The $B_1$ and $B_2$ monolayers have opposite dipole orientation to each other. Other specific structures are also suitable for use in the present invention, such as one monolayer A combined with more than two monolayers B; or one monolayer A combined with monolayers B of more than two distinct polymers.

For films of the ABB and $AB_1B_2$ structures the nonlinear optically active monolayers exhibit a net polar alignment, thereby allowing second order nonlinear optic processes. In these structures the second harmonic generation intensity follows quadratic dependence on the number of nonlinear optically active monolayers for at least up to ten ABB or $AB_1B_2$ units (30 monolayers). The second harmonic generation signal from these films exhibits long-term stability measuring in months. For AB-type films prepared from particular polymers the desirable quadratic dependence of the second harmonic generation intensity is followed on film thicknesses ranging from several to more than 100 monolayers. These films also exhibit long term (months) stability of the second harmonic generation signal.

The polymeric monolayers used in the films of the present invention are amphiphilic. For the AB-type of films if the polymer backbone is hydrophilic, then the substituent groups of the polymer are terminated by a group which is hydrophobic relative to the backbone. In such polymers where a chromophore group is itself sufficiently hydrophobic, no additional hydrophobic groups are needed. Alternately, if the polymer backbone is hydrophobic, then the substituent groups of the polymer are terminated by a moiety which is hydrophilic relative to the backbone.

For an ABB or $AB_1B_2$ structure the second order nonlinearly polarizable chromophore of monolayer A is in a substituent group terminating with a moiety having strong affinity for either the polymeric backbone or substituent groups of monolayer B. For these structures the polymeric backbones of B or $B_1$ and $B_2$ must either be both hydrophobic or both hydrophilic. Thus the interaction between the active and buffer layers will depend in part upon the orientation of each monolayer with respect to the others. Thus, monolayer A itself does not have to be strongly amphiphilic. An example of an ABB film is a monolayer-forming polymer with nonlinearly polarizable active substituent groups which are terminated by a nitro group or cyano group used with a polyoxazoline polymer.

In the Langmuir-Blodgett films use of fluorinated hydrocarbon groups is preferred which improve both the optical quality and stability of the films. The advantages of use of fluorinated hydrocarbon groups are twofold. First, fluorocarbons are usually more hydrophobic than conventionally used hydrocarbons so adequate hydrophobicity can be provided by much shorter fluorocarbon segments than their hydrocarbon counterparts. This effect is used to minimize the dilution of optical nonlinearity. Second, fluorocarbons are more rigid than the corresponding hydrocarbons. The presence of the rigid fluorocarbon groups enhances both the optical quality and stability of the films used in the present invention. The tenacity of the films is further improved by use of highly branched hydrophobic groups of fluorocarbons. Any fluorocarbon group can be used herein. Particularly suitable fluorocarbons include linear, branched or cyclic perfluoroalkyl groups having at least 4 carbon atoms and having 0 to 3 double bonds, such as $C_6$ to $C_{12}$ perfluoroalkyleneoxy or $C_6$ to $C_{12}$ perfluoroalkylenethio groups. Other examples include, but are not limited to, $CF_3(CF_2)_n$—wherein n is greater than or equal to 4, or $[(CF_3)_2CF]_2C=C(CF_3)O—$.

Langmuir-Blodgett films especially suitable for use in the present invention comprise repeating units of at least one A monolayer combined with at least one B monolayer. The A monolayers comprise an amphiphilic polymer having repeating units of formula (1), (2) or (3) having the following structures, and the B monolayers comprise an amphiphilic polymer having repeating units of formula (4), (5) or (7) having the following structures:

(1) 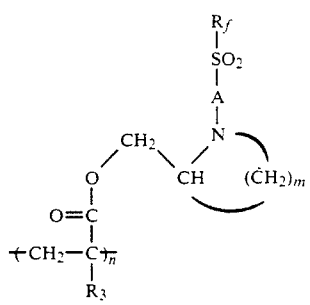

(2) 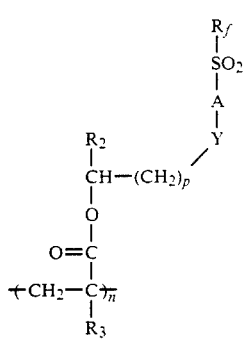

(3) 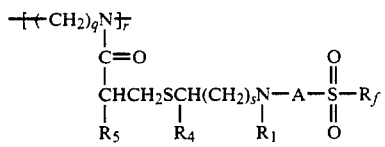

(4) 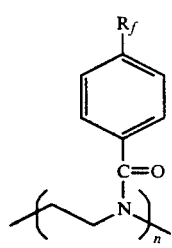

(5) 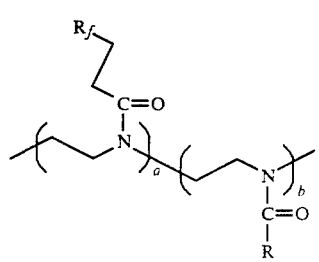

(7) 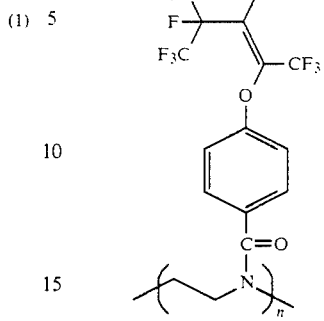

wherein $R_f$ for formulae (1), (2), (4) and (5) is a linear, branched or cyclic perfluoroalkyl group having at least 4 carbon atoms and having 0 to 3 double bonds;

$R_f$ for formula (3) is $(CX_2)_t X$, X is F or H, and t is an integer of from 1 to 18;

A for formulae (1) and (2) is phenylene or stilbeneyl;

A for formula (3) is phenylene;

Y is O, S, or $NR_1$; provided that when Y is $NR_1$, A for formula (2) is phenylene, stilbeneyl or biphenylene;

R is $C_6$ to $C_{20}$ alkyl;

$R_1$ is H or $C_1$ to $C_5$ alkyl;

$R_2$ and $R_3$ are each independently H or $C_1$ to $C_5$ alkyl;

$R_4$ and $R_5$ are each independently H or $C_1$ to $C_{17}$ alkyl;

m is an integer from 2 to 5;

n is an integer of at least 3;

p is an integer from 0 to 5; provided that p is 1 when Y is $NR_1$ and A is biphenylene;

q is an integer from 2 to 3;

r is an integer of at least 3;

s is an integer from 0 to 17; and a and b are each independently an integer of at least 2.

The polymers of formulae (1), (2) and (3) as defined above are the polymer A type containing a chromophore that exhibits large hyperpolarizability. These chromophores may be viewed of comprising three parts, a) an electron accepting perfluoroalkylsulfonyl group, b) an electron donating amino, or ether oxygen or sulfur group, and c) a group bridging the above two which comprises a phenylene, biphenylene, stilbeneyl, or phenylazo-phenylene group. The chromophore is linked to the polymer backbone by a spacer group such as a linear or cyclic hydrocarbon group.

Examples of such polymers include N-substituted polyethyleneimine, polyacrylate, polymethacrylate, or copolymers thereof. These polymers have a hydrophilic backbone relative to fluorocarbon groups and are especially suitable for use with perfluorocarbon hydrophobic groups.

Films of the ABB or $AB_1B_2$ type are prepared from a monolayer of a polymer A having repeating units of formula (6) combined with one or more polymers B having repeating units of formula (4), (5) or (7) having the following structures:

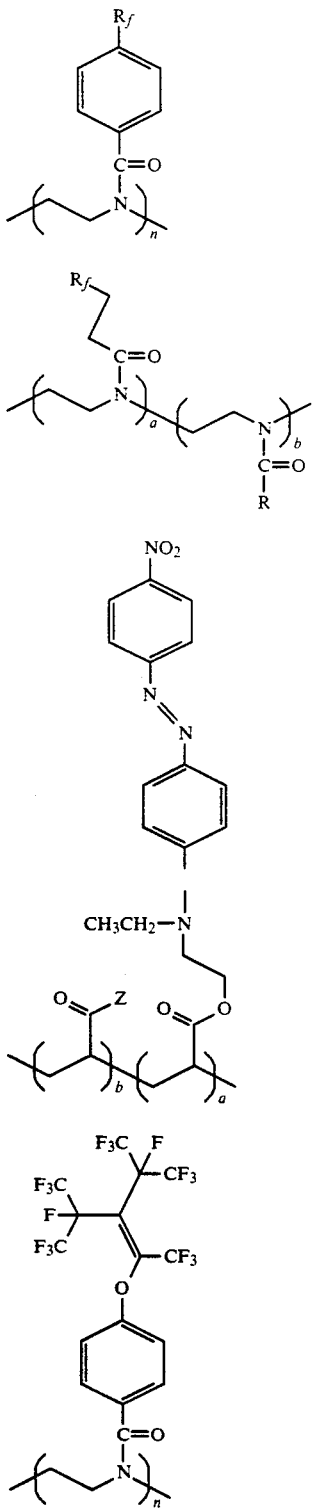

wherein $R_f$ is a linear, branched or cyclic perfluoroalkyl group having at least 4 carbon atoms and having 0 to 3 double bonds;

Z is $OR_6$ or Cl;

$R_6$ is H or $C_1$ to $C_{10}$ alkyl;

n is an integer of at least 3;

a is an integer of at least 2; and b is an integer of at least 2;

provided that for formula (6) the ratio of a:b is from about 0.1 to about 1.

Preferred for use herein for the ABB type films are polymers of formulae (6) and (7).

The films can be prepared by the Langmuir-Blodgett technique. In the standard Langmuir-Blodgett procedure, a substrate (e.g., glass) slide is repetitively dipped into and withdrawn out of a trough of monolayer-clad water while the surface pressure of the monolayer is kept constant by a compressing barrier at the water surface. During the dipping-withdrawing cycles, the amphiphiles are transferred, monolayer by monolayer, to the surface of the substrate slide. M. Sugi, J. Mol. Electron, Vol. 1, p. 3 (1985), herein incorporated by reference, provides details of the Langmuir-Blodgett technique.

The waveguides of the present invention are useful to convert laser light into a different wavelength. Such conversions have various applications in the optical electronics field, such as in optical recording technology. The fabrication process of the present invention is useful in the preparation of such waveguides.

The following examples illustrate the present invention but are not intended to limit it in any way.

EXAMPLE 1

With a semiconductor diode laser at 850 nm as the light source, two halves of an optically passive waveguiding medium are prepared by $K^+-Na^+$ ion exchange in soda-lime glass substrates and pressed together with nonlinear optical film sandwiched in the middle. The refractive index in the glass substrate is 1.51 at 850 nm and 1.53 at 425 nm (the wavelength of the generated second-harmonic light). In the waveguide, the refractive indices are 1.52 and 1.54, respectively, at 850 nm and 425 nm. The nonlinear optical film consists of 100 alternate monomolecular layers (roughly 0.15 μm thick) of Polymers A and B which are transparent at both wavelengths of concern, and the hybrid waveguide is a channel waveguide 1-cm long and $5\times5$ μm$^2$ in its transverse dimensions. From Equation (3) with m=1, for phase matching involving only zeroth-order waveguide modes, the modulation period of $\chi^{(2)}$ is about 20 μm. Using an estimated $\chi^{(2)}$ value $-8\times10^{14}$ esu per monolayer for Polymer A, and neglecting a small contribution from Polymer B, for a laser power of 100 mW coupled into the waveguide, about 1 mW can be converted into blue light at 425 nm via the phase-matched second-harmonic generation. Such a power level in the blue region is very useful for optical recording.

EXAMPLE 2

This Example illustrates the fabrication of a hydrid optical waveguide for phase-matched nonlinear wavelength conversion in accordance with the present invention. The fabrication process was conducted in accordance with FIG. 5 as follows:

Step 1: A clean, optically polished glass slide (Schott B270 glass) was prepared. A wire mask made of carbon fiber, having a diameter of 6 μm was laid on one surface of the glass slide. The wire mask was aligned along the intended waveguiding direction and extended over the edges of the glass slide. The masked slide was then coated with a 1 μm layer of aluminum with a vacuum deposition system (Balzers Model MED010). A 6 μm wide uncoated region was formed across the glass slide after the wire mask was removed. The glass slide was then dipped into a molten $KNO_3$ bath kept at 370° C. for 5 hours. During this period the potassium ions diffused into the uncoated surface region of the glass slide, replacing the sodium ions in the glass; consequently, a channel waveguide 6 μm wide and about 2 μm deep was formed at the glass surface. In the waveguide surface region, the refractive index was about 0.01 higher than that of the bulk glass (1.52 at 633 nm). The excess KNO$_3$ was rinsed off with water and the aluminum coating was completely removed by an aqueous KOH solution. The waveguide slide was further cleaned in a mixture of H$_2$SO$_4$ and "Nochromix" (from Godax Laboratories, Inc., 480 Canal Street, New York, N.Y. 10013), followed by a thorough rinse with purified (distilled and deionized) water.

Step 2: A commercial Langmuir-Blodgett film deposition system (KSV Model 5000) was employed for coating a nonlinear optical polymer film onto the channel waveguide prepared in Step 1. The Langmuir-Blodgett system included two connected troughs, namely, "A" or "B", filled with purified (distilled and deionized) water. Each trough was for preparing one kind of polymer monolayer. Specifically, the polymer for trough "A" is described by formula (1), where $R_f = C_{10}F_{21}$, A=phenylene, and m=3, and the polymer for trough "B" is described by formula (7). A monolayer of each polymer was first prepared on the water surface in each trough as follows: An adequate amount of a 1.0 mg/ml CHCl$_3$ solution of the polymer for trough "A" was spread on the water surface of trough "A", forming a low density monolayer. After the evaporation of the solvent, the monolayer was compressed by a moving barrier to a surface pressure of 35 dyn/cm. This surface pressure was maintained by the barrier during the entire film deposition process. Similarly, a monolayer of the polymer for trough "B" was prepared in trough "B" and kept at 35 dyn/cm. The thin film deposition cycle involved dipping of the waveguide slide, prepared in Step 1, into trough "A", during which a monolayer "A" was deposited onto the slide, and withdrawing the slide out of trough "B", during which the monolayer "B" was deposited. The dipping-withdrawing speed was set at 5 mm/min. After 50 deposition cycles, a polymer film consisting of a total of 100 interlacing monolayers of polymers "A" and "B" was deposited on top of the glass channel waveguide. This Langmuir-Blodgett film has a thickness of about 0.15 μm and a refractive index of about 1.51 at 633 nm. It was further verified that the intensity of optical second harmonic generation increased quadratically with the number of monolayer "A" in the film.

Step 3: A spatially periodic modification in the Langmuir-Blodgett film prepared in Step 2 was achieved by a photobleaching process induced by a UV laser light (Spectra-Physics Model 2025 argon laser, operated at wavelengths of 351-364 nm). The coated waveguide slide was mounted on a computer-controlled, stepper-motor driven XY translation stages (0.1 μm spatial resolution). The UV laser beam, with its power set at 40 mW, was focused to an 8 μm spot on the Langmuir-Blodgett film. Scanning the focused laser beam across the Langmuir-Blodgett film at a speed of 200 μm/sec in a spatially periodic pattern (by actually translating the waveguide slide relative to the laser beam) created photobleached striped regions in the film. It was verified that the nonlinear susceptibility $\chi^{(2)}$ in a photobleached region was about 10 times smaller than that of an unbleached region. The grating-like stripes were aligned perpendicular to the waveguiding direction. The width of each stripe was comparable to the spot size of the laser beam, and the distance between the centers of two neighboring stripes corresponds to a period, Λ, which was determined to satisfy the phase-matching condition set forth in Eq. (3). For converting a 850 nm laser light to 425 nm by second harmonic generation, $\Lambda = 2\pi[k^{(0)}(2\omega) - 2k^{(0)}(\omega)]^{-1}$, which is about 20 μm.

Step 4: A second optically passive waveguide consisting of a gelatin film was prepared as follows: A 120 mg/ml aqueous solution of pure gelatin (Kodak No. 16552) was heated to 60° C. and spin-casted at 1500 rpm onto the Langmuir-Blodgett film coated waveguide slide prepared in Step 3. The gelatin film was about 1 μm thick and it's refractive index was about 1.53 at 633 nm.

Figure 4C:
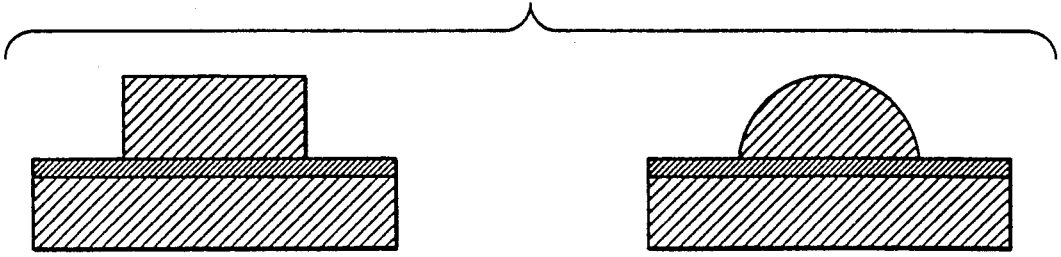
FIG. 4c depicts refractive index profiles of waveguide structures having a hybrid planar-channel cross section.

The cross-sectional view of the waveguide prepared above resembles that shown in FIG. 4(c). The waveguiding region region consists of a thin nonlinear Langmuir-Blodgett film sandwiched between a channel waveguide region (i.e., the ion-exchanged glass) and a planar waveguide region (i.e. the gelatin film), while the substrate region is the unmodified glass slide and the cover region is simply air.

What is claimed is:

1. A waveguide for second order nonlinear wavelength conversion comprising a thin film embedded in an otherwise optically passive waveguiding medium wherein 1) said film comprises a nonlinear optically active medium having periodic modifications of the nonlinear optical properties along the propagation direction, 2) said film thickness is not greater than 50% of the smallest transverse dimension of the waveguide, and 3) said film comprises a multiplicity of adjacent monomolecular polymeric amphiphilic layers wherein the net nonlinearity of the film increases with the number of nonlinear optically active layers.

2. The waveguide of claim 1 wherein said film width is greater than or equal to the largest transverse dimension of the waveguide.

3. The waveguide of claim 1 wherein the top and bottom surfaces of the waveguide are covered by cladding media having a lower index of refraction than the index of refraction of the waveguiding medium.

4. The waveguide of claim 1 having a channel cross-sectional shaped refractive index profile.

5. The waveguide of claim 1 having a planar cross-sectional shaped refractive index profile.

6. The waveguide of claim 1 having a mixed channel-planar cross-sectional shaped refractive index profile.

7. The waveguide of claim 1 wherein the film has at least every third monolayer comprising a polymer having substituent groups containing a second order nonlinearly polarizable chromophore, and wherein the remaining monolayers each comprises a polymer having substituent groups with weak or no nonlinear polarizability.

8. The waveguide of claim 7 wherein one or both of the polymers comprising the film have a hydrophilic backbone, and the polymer substituent groups with weak or no nonlinear polarizability are terminated by a hydrophobic moiety.

9. The waveguide of claim 8 wherein the polymer having substituent groups containing second order nonlinearly polarizable chromophores comprises a terminal hydrophobic moiety in each of said substituent groups.

10. The waveguide of claim 8 or 9 wherein the hydrophobic moiety of the film comprises a branched or linear fluorocarbon group.

11. The waveguide of claim 7 wherein one or both of the polymers comprising the film have a hydrophobic backbone, and the polymer substituent groups having weak or no nonlinear polarizability are terminated by a hydrophilic moiety.

12. The waveguide of claim 7 wherein the polymer having substituent groups containing second order nonlinearly polarizable chromophores comprises a terminal hydrophilic moiety in each of said substituent groups.

13. The waveguide of claim 7 wherein the backbone of each of the polymers in the film comprises a) a N-substituted polyethyleneimine homopolymer of three or more repeating units, b) a polyacrylate homopolymer of three or more repeating units, c) a polymethacrylate homopolymer of three or more repeating units, or d) a copolymer of three or more units of polyacrylate, polymethacrylate, or N-substituted polyethyleneimine.

14. The waveguide of claim 7 wherein the film comprises repeating groups of two polymeric monolayers, each said repeating group comprising one layer A of a polymer having repeating units of formula (1), (2), or (3) combined with one layer B of a polymer having repeating units of formula (4), (5) or (7), wherein formulae (1) through (5) and (7) have the following structures:

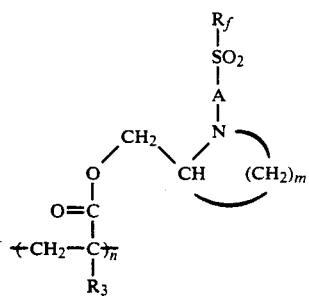 (1)

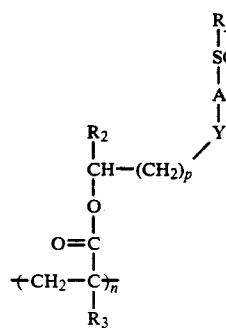 (2)

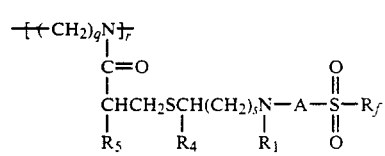 (3)

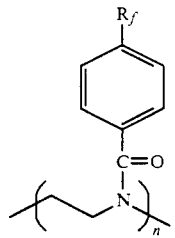 (4)

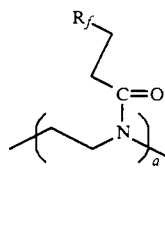 (5)

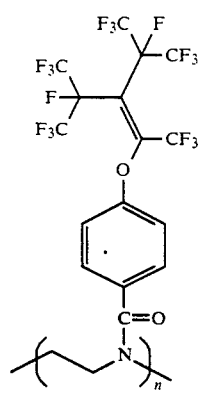 (7)

wherein
$R_f$ for formulae (1), (2), (4) and (5) is a linear, branched or cyclic perfluoroalkyl group having at least 4 carbon atoms and having 0 to 3 double bonds;
$R_f$ for formula (3) is $(CX_2)_t X$; X is F or H, and t is an integer of from 1 to 18;
A for formulae (1) and (2) is phenylene or stilbeneyl;
A for formula (3) is phenylene;
Y is O, S or $NR_1$; provided that when Y is $NR_1$, A for formula (2) is phenylene, stilbeneyl or biphenylene;
R is $C_6$ to $C_{20}$ alkyl;
$R_1$ is H or $C_1$ to $C_5$ alkyl;
$R_2$ and $R_3$ are each independently H or $C_1$ to $C_5$ alkyl;
$R_4$ and $R_5$ are each independently H or $C_1$ to $C_{17}$ alkyl;
m is an integer from 2 to 5;
n is an integer of at least 3;
p is an integer from 0 to 5; provided that p is 1 when Y is $NR_1$ and A is biphenylene;
q is an integer from 2 to 3;
r is an integer of at least 3;
s is an integer from 0 to 17; and
a and b are each independently an integer of at least 2.

15. The waveguide of claim 1 wherein the film comprises a multiplicity of adjacent polymeric, amphiphilic monolayers, said film having second order optical nonlinearity which increases with the number of said monolayers which are nonlinear optically active, wherein said monolayers repeat in groups of three in which each repeating unit exhibits a net polar alignment and comprises
- a) one monolayer A of an amphiphilic polymer, and
- b) two monolayers B of a distinct amphiphilic polymer having opposite orientation to each other.

16. The waveguide of claim 15 wherein the two monolayers B of the film are distinct from each other as well as distinct from monolayer A of the film.

17. The waveguide of claim 15 or 16 wherein the backbone of the polymers in the film 1) of monolayers A and B are all hydrophilic or all hydrophobic; 2) of monolayer A is hydrophilic and of monolayers B are hydrophobic; or 3) of monolayer A is hydrophobic and of monolayers B are hydrophilic.

18. The waveguide of claim 17 wherein polymer A in the film contains a second order nonlinearly polarizable chromophore which is in a substituent group terminating with a moiety having strong affinity for the polymeric backbone or substituent groups of monolayer B.

19. The waveguide of claim 15 or 16 wherein monolayer A in the film comprises a polymer having repeating units of formula (6) and each monolayer B in the film comprises one or more of a polymer having repeating units of formula (4), (5) or (7) wherein formulae (4), (5), (6), and (7) have the following structures:

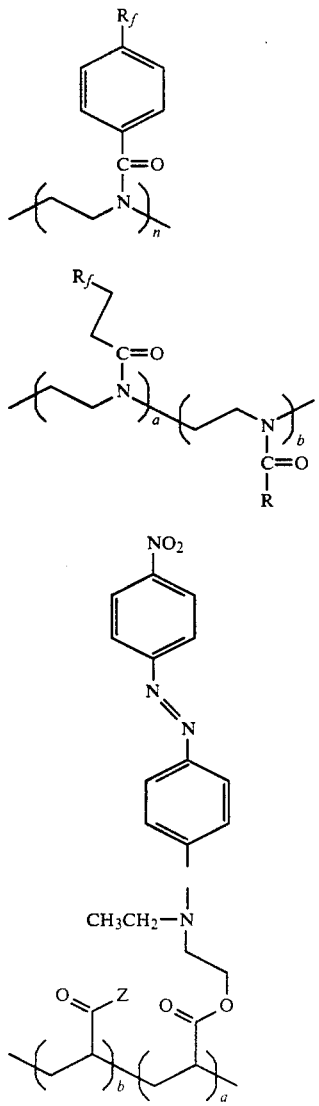

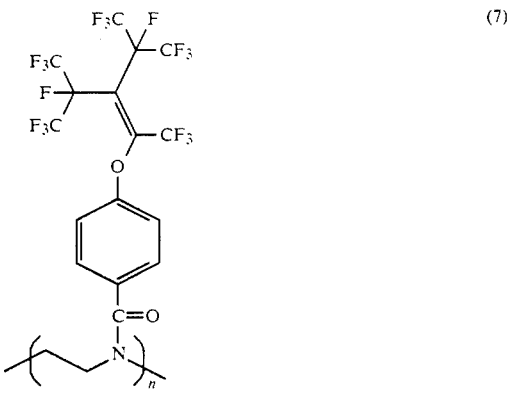

wherein
- $R_f$ is a linear, branched or cyclic perfluoroalkyl group having at least 4 carbon atoms and having 0 to 3 double bonds;
- Z is $OR_6$ or Cl;
- $R_6$ is H or $C_1$ to $C_{10}$ alkyl;
- n is an integer of at least 3;
- a is an integer of at least 2; and
- b is an integer of at least 2;
- provided that for formula (6) the ratio of a:b is from about 0.1 to about 1.

20. A process for fabrication of a waveguide for second order nonlinear wavelength conversion comprising the steps of:
- (1) preparation of a first optically passive waveguiding medium from an optically passive medium in planar or channel form;
- (2) deposition on the surface of the first optically passive waveguiding medium of a thin film having a net second order optical nonlinearity which increases with the film thickness;
- (3) periodical modification of said film in the wave guiding direction by local irradiation of light or particles to generate a periodic structure of alternating modified and unmodified regions; and
- (4) deposition of a second optically passive waveguiding medium onto the film to form a complete waveguide having the film embedded therein.

21. The process of claim 20 wherein the first optically passive waveguiding medium in step (1) is prepared by dipping a glass slide into a molten nitrate salt of a monovalent cation selected from the group consisting of $K^+$, $Rb^+$, $Cs^+$, $Ag^+$ or $Tl^+$.

22. The process of claim 20 wherein the first optically passive waveguiding medium in step (1) is prepared by polishing off a portion of the cladding of an optical fiber to expose the fiber core.

23. The process of claim 20 wherein the optically passive waveguiding medium in step (1) is prepared in planar form by depositing a polymeric thin film from solution onto a substrate, said substrate having a refractive index lower than the refractive index of the polymeric thin film.

24. The process of claim 23 wherein the total thickness of the polymeric thin film is less than 5 μm.

25. The process of claim 20 wherein the optically passive waveguiding medium in step (1) is a Langmuir-Blodgett film of optically passive material deposited onto a substrate, said substrate having a refractive index lower than the refractive index of the Langmuir-Blodgett film.

26. The process of claim 25 wherein the total thickness of the Langmuir-Blodgett film is less than 5 μm.

27. The process of claim 20 wherein the film of step (2) is deposited by repetitively dipping and withdrawing the first optically passive waveguiding medium into and out of one or more distinct troughs, each containing water with a distinct polymeric monolayer spread upon the water surface.

28. The process of claim 20 wherein the film deposited in step (2) is a polymeric thin film poled by electric fields.

29. The process of claim 20 wherein the film is modified in step (3) such that the modified and unmodified regions have an identical width of $\Lambda/2$ wherein $\Lambda$ is a period along the z direction.

30. The process of claim 20 wherein the second optically passive waveguiding medium of step (4) is formed by directly depositing a thin film by sputtering, spin-casting, or Langmuir-Blodgett deposition onto the periodically modified film of step (3).

* * * * *

UNITED STATES PATENT AND TRADEMARK OFFICE
CERTIFICATE OF CORRECTION

PATENT NO. : 5,155,791
DATED : October 13, 1992
INVENTOR(S) : Hui Hsiung

It is certified that error appears in the above-identified patent and that said Letters Patent is hereby corrected as shown below:

Column 5, line 36:
"tity $(\lambda/2\pi)[(n_g)^2-(n_f)^2]$}, where $\lambda$ is the shortest wave-" should read --tity $(\lambda/2\pi)[(n_g)^2 - (n_f)^2]^{-1/2}$, where $\lambda$ is the shortest wave --.

Column 5, line 62, "energy requires that $\omega_3=\omega+\omega_2$ (sum-frequency gener-" should read --energy requires that $\omega_3=\omega_1+\omega_2$ (sum-frequency gener- --.

Column 6, line 7, "The nonlinear susceptibility, $\chi^{(2)}(\omega_3=\omega_1\pm\chi_2)$, of the" should read --The nonlinear susceptibility, $\chi^{(2)}(\omega_3=\omega_1\pm\omega_2)$, of the--.

Signed and Sealed this

Twenty-third Day of November, 1993

Attest:

Attesting Officer

BRUCE LEHMAN

Commissioner of Patents and Trademarks